(12) United States Patent
Henry

(10) Patent No.: US 7,228,683 B2
(45) Date of Patent: Jun. 12, 2007

(54) METHODS AND APPARATUS FOR GENERATING GAS TURBINE ENGINE THRUST USING A PULSE DETONATOR

(75) Inventor: John Leslie Henry, Westchester, OH (US)

(73) Assignee: General Electric Company, Schenecady, NY (US)

( * ) Notice: Subject to any disclaimer, the term of this patent is extended or adjusted under 35 U.S.C. 154(b) by 199 days.

(21) Appl. No.: 10/895,585

(22) Filed: Jul. 21, 2004

(65) Prior Publication Data
US 2006/0016170 A1 Jan. 26, 2006

(51) Int. Cl.
*F02K 3/11* (2006.01)
(52) U.S. Cl. .................. 60/204; 60/226.1; 60/248; 60/224
(58) Field of Classification Search .................. 60/204, 60/226.1, 247, 248, 224; 244/74
See application file for complete search history.

(56) References Cited

U.S. PATENT DOCUMENTS

| | | | |
|---|---|---|---|
| 3,332,236 A | 7/1967 | Kunsagi | |
| 5,345,758 A | 9/1994 | Bussing | |
| 5,353,588 A | 10/1994 | Richard | |
| 5,513,489 A | 5/1996 | Bussing | |
| 5,546,744 A * | 8/1996 | Winfree et al. | 60/247 |
| 5,557,926 A | 9/1996 | Hunter, Jr. et al. | |
| 5,615,548 A | 4/1997 | Winfree et al. | |
| 5,800,153 A | 9/1998 | DeRoche | |
| 5,873,240 A | 2/1999 | Bussing et al. | |
| 5,901,550 A | 5/1999 | Bussing et al. | |
| 5,937,635 A | 8/1999 | Winfree et al. | |
| 6,062,018 A | 5/2000 | Bussing | |
| 6,085,786 A | 7/2000 | Forsythe | |
| 6,347,509 B1 | 2/2002 | Kaemming et al. | |
| 6,446,428 B1 | 9/2002 | Kaemming et al. | |
| 6,460,342 B1 | 10/2002 | Nalim | |
| 6,477,829 B1 | 11/2002 | Hunter et al. | |
| 6,494,034 B2 | 12/2002 | Kaemming et al. | |
| 6,505,462 B2 | 1/2003 | Meholic | |
| 6,526,936 B2 | 3/2003 | Nalim | |

(Continued)

FOREIGN PATENT DOCUMENTS

GB 716456 10/1954

(Continued)

OTHER PUBLICATIONS

International Search Report;London Patent Office; Dated Oct. 12, 2005; Reference 13DV-145502/10676; Application No. GB0510168.8; 3 pgs.

*Primary Examiner*—Ehud Gartenberg
(74) *Attorney, Agent, or Firm*—William Scott Andes; Armstrong Teasdale LLP

(57) ABSTRACT

Methods and apparatus for generating thrust from a gas turbine engine using a pulse detonation system is provided. The gas turbine engine includes a fan assembly, and a bypass duct channeling air to a core engine and the pulse detonation system. The method includes injecting a charge of fuel into a pulse detonation tube that is coupled radially outward from the core engine, and controlling a supply of air from the fan into the pulse detonation tube through an opening in the inlet end of the pulse detonation tube using a rotary valve that is positioned radially outward from the core engine.

19 Claims, 3 Drawing Sheets

U.S. PATENT DOCUMENTS

| | | | |
|---|---|---|---|
| 6,550,235 B2 * | 4/2003 | Johnson et al. | 60/204 |
| 6,584,761 B2 * | 7/2003 | Hunter, Jr. | 60/204 |
| 6,584,765 B1 | 7/2003 | Tew et al. | |
| 6,668,542 B2 | 12/2003 | Baker et al. | |
| 6,889,505 B2 * | 5/2005 | Butler et al. | 60/776 |
| 6,904,750 B2 * | 6/2005 | Venkataramani et al. | 60/226.1 |
| 7,047,724 B2 * | 5/2006 | Nordeen et al. | 60/226.1 |
| 2004/0123583 A1 * | 7/2004 | Nordeen et al. | 60/226.1 |
| 2004/0172950 A1 * | 9/2004 | Venkataramani et al. | 60/776 |
| 2004/0244359 A1 * | 12/2004 | Koshoffer et al. | 60/247 |
| 2005/0000205 A1 * | 1/2005 | Sammann et al. | 60/226.1 |
| 2005/0028531 A1 * | 2/2005 | Venkataramani et al. | 60/776 |

FOREIGN PATENT DOCUMENTS

| | | |
|---|---|---|
| GB | 743492 | 1/1956 |
| GB | 774756 | 5/1957 |

* cited by examiner

METHODS AND APPARATUS FOR GENERATING GAS TURBINE ENGINE THRUST USING A PULSE DETONATOR

The U.S. Government has certain rights in this invention pursuant to contract number NAS3-01135.

BACKGROUND OF THE INVENTION

This invention relates to gas turbine engines, and more particularly, to a pulse detonation system for a gas turbine engine.

At least some known gas turbine engines include a forward fan, a core engine, and a power turbine. The core engine includes at least one compressor that provides pressurized air to a combustor wherein the air is mixed with fuel and ignited for generating hot combustion gases. The combustion gases are channeled downstream to one or more turbines that extract energy therefrom to power the compressor and to provide useful work, such as powering an aircraft. The thrust available from at least some known gas turbine engines may limit the operational speed of the associated aircraft to an upper Mach number of approximately two.

A pulse detonation engine may produce additional thrust in comparison to other known gas turbine engines using a series of repetitive detonations of a fuel/air mixture within a detonation chamber. Each detonation generates a wave that propagates at supersonic speeds. Each wave compresses fluid within the detonation chamber, thus increasing the pressure, density, and temperature of the fluid. As the wave is channeled towards the open rearward end of the engine, thrust is created. The pulse detonation cycle is then repeated. Such an engine may be able to enable the associated aircraft to attain Mach numbers greater than a gas turbine engine, for example, Mach 4 or greater. However, equipping an aircraft with multiple combinations of different type of engines may be impracticable, and/or cost prohibitive.

BRIEF DESCRIPTION OF THE INVENTION

In one embodiment, a method for generating thrust from a gas turbine engine using a pulse detonation system is provided. The gas turbine engine includes a fan assembly, and a bypass duct channeling air to a core engine and the pulse detonation system. The method includes injecting a charge of fuel into a pulse detonation tube that is coupled radially outward from the core engine, and controlling a supply of air from the fan into the pulse detonation tube through an opening in the inlet end of the pulse detonation tube using a rotary valve that is positioned radially outward from the core engine.

In another embodiment, a gas turbine engine is provided. The gas turbine engine includes a fan assembly, a core engine coupled in flow communication to and downstream from the fan assembly, a radially outer annular bypass duct surrounding the core engine, the bypass duct extending in flow communication downstream from the fan assembly, and at least one pulse detonation tube coupled downstream and radially outward from the core engine.

In yet another embodiment, a gas turbine engine assembly is provided. The gas turbine engine includes a fan assembly, a core engine coupled in flow communication to and downstream from the fan assembly, a radially outer annular bypass duct surrounding the core engine, the bypass duct extending in flow communication downstream from the fan assembly, and a plurality of pulse detonation tubes circumferentially spaced within the bypass duct about a longitudinal axis of the core engine. Each pulse detonation tube includes an inlet end for receiving air from the fan, an exhaust end for discharging combustion gases therefrom, and a rotary valve comprising a rotor disk comprising at least one opening defined therein and at least one solid portion, the rotor disk is between the plurality of pulse detonation tubes and the bypass duct, the rotor disk is rotatable to control airflow through the opening into the plurality of pulse detonation tubes during a first portion of the rotation, and wherein the rotor disk further rotates so that the solid portion is positioned over the inlet end of the one of the plurality of pulse detonation tubes during a second portion of the rotation so that the fuel and air inside the one of the plurality of pulse detonation tubes can be detonated by at least one of the ignitor and residual heat within the pulse detonation tube, the rotor disk rotatably drive by at least one of an electric motor, an air motor, and a hydraulic motor.

DETAILED DESCRIPTION OF THE INVENTION

Figure 1:
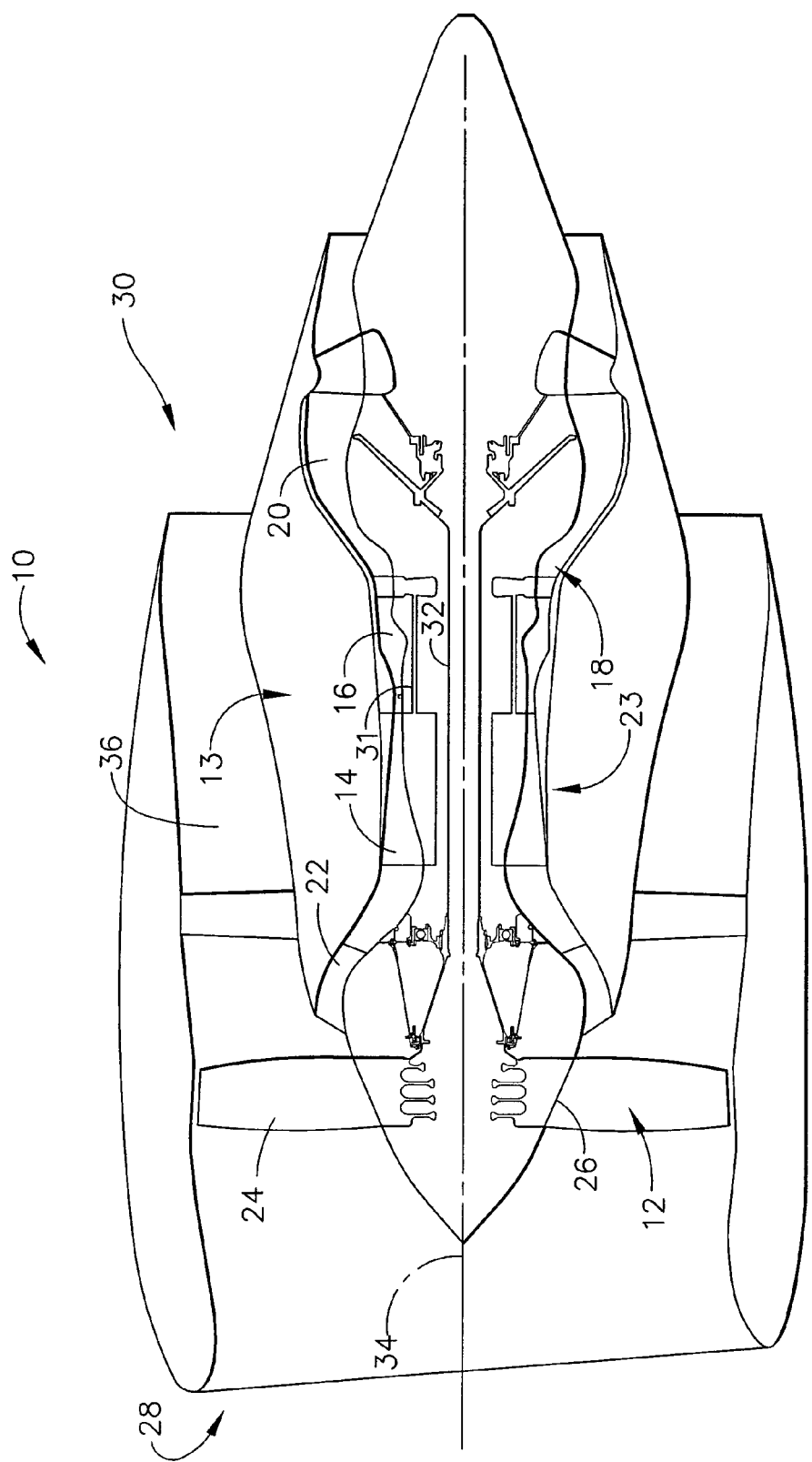
FIG. 1 is a schematic illustration of an exemplary embodiment of a gas turbine engine.

FIG. 1 is a schematic illustration of an exemplary embodiment of a gas turbine engine 10 including a fan assembly 12, a booster 22, a high pressure compressor 14, and a combustor 16. Engine 10 also includes a high pressure turbine 18, and a low pressure turbine 20. High pressure compressor 14, combustor 16, and high pressure turbine 18 define a core engine 23. Fan assembly 12 includes an array of fan blades 24 extending radially outward from a rotor disc 26. Engine 10 has an intake side 28 and an exhaust side 30. Compressor 14 and turbine 18 are coupled by a first rotor shaft 31, and fan assembly 12 and turbine 20 are coupled by a second rotor shaft 32. Compressor 14, turbine 18, fan assembly 12, and turbine 20 are substantially co-axial about a longitudinal axis 34. A radially outer annular bypass duct circumscribes core engine 23 at least partially from intake side 28 to exhaust side 30.

In operation, air flows through fan assembly 12 and a portion of air compressed in fan 12 is supplied to high pressure compressor 14 and a remainder is bypassed around core engine 23 through bypass duct 36. The highly compressed air is delivered to combustor 16. Airflow (not shown in FIG. 1) from combustor 16 drives turbines 18 and 20, and turbine 20 drives fan assembly 12 by way of shaft 32.

Figure 2:
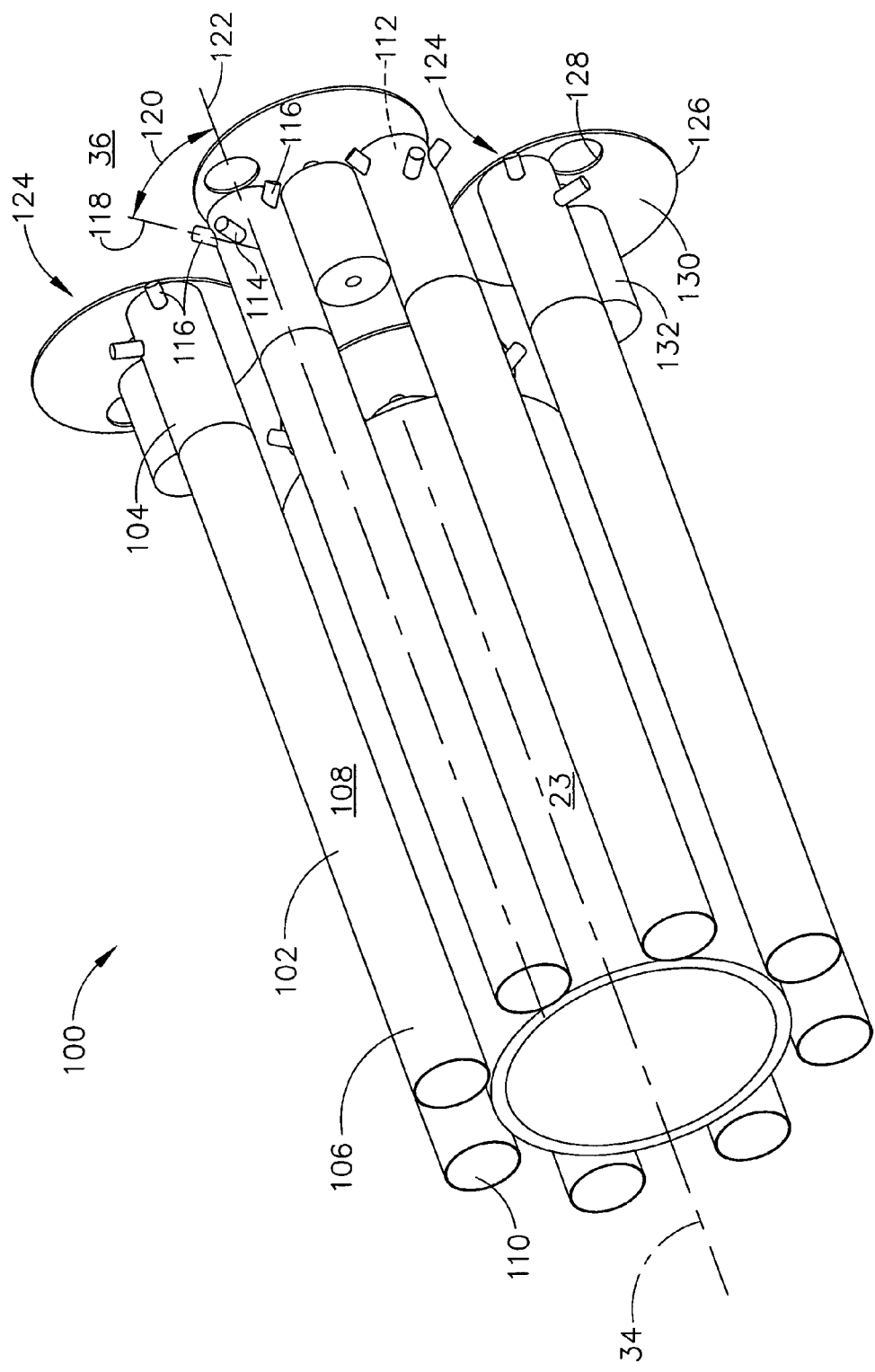
FIG. 2 is a perspective view of an exemplary pulse detonation system that may be used with the gas turbine engine.

FIG. 2 is a perspective view of an exemplary pulse detonation system 100 that may be used with gas turbine engine 10 (shown in FIG. 1). Pulse detonation system 100 includes at least one pulse detonation tube 102 that includes an inlet end portion 104, an outlet end portion 106, a generally cylindrically-shaped body 108, and a bore 110 extending therethrough. Each inlet end portion 104 includes an inlet end opening 112, an ignitor boss 114, and at least one fuel injector boss 116. In the exemplary embodiment, each pulse detonation tube 102 is illustrated with two fuel injector bosses 116, however it should be understood that more or less fuel injector bosses 116 may be used to facilitate generating an optimum fuel/air ratio and fuel/air distribution in pulse detonation tube 102. In the exemplary embodiment, a longitudinal axis 118 of fuel injector boss 116 is inclined by an angle 120 with respect to a longitudinal axis 122 of pulse detonation tube 102. Each fuel injector boss 116 may be inclined at a different angle with respect to each other fuel injector boss 116. Each angle may be selected to facilitate generating an optimum fuel/air ratio and fuel/air distribution in pulse detonation tube 102. In one embodiment, fuel injector boss 116 includes a ball-and-socket joint such that angle 120 is variably selectable.

In the exemplary embodiment, eight pulse detonation tubes 102 are arranged circumferentially spaced about core engine 23 in groups of two pulse detonation tubes 102. Pulse detonation tubes 102 are arranged in bypass duct 36 such that longitudinal axis 122 is radially outward from longitudinal axis 34. Each pair of pulse detonation tubes 102 is coupled to a rotary valve 124 that facilitates controlling the flow of air from fan 12 to pulse detonation tube 102. Rotary valve 124 includes a body (not shown), a rotor disk 126 having at least one disk opening 128 and at least one solid portion 130. Rotary valve 124 is positioned such that rotor disk 126 is positioned between inlet end opening 112 and bypass duct 36. Rotor disk 126 is rotatable such that during a first portion of a rotation of rotor disk 126, disk opening 128 is positioned in substantial alignment with inlet end opening 112 to allow air from bypass duct 36 to enter a respective pulse detonation tube 102. During a second portion of the rotation of rotor disk 126 solid portion 130 is positioned over inlet end opening 112 such that fuel and air inside the respective pulse detonation tube 102 may be detonated by igniting the mixture using an ignitor (not shown) or using residual heat within pulse detonation tube 102. Rotor disk 126 may be rotatably driven by a motor 132, for example, but, not limited to, an electric motor, an air motor, and a hydraulic motor. In the exemplary embodiment, motor 132 is an air motor, such as an air turbine that receives bleed air from core engine 23 to produce rotational motive power to rotate rotor disk 126. Motor 132 is also positioned within bypass duct 36 such that a centerline of motor 132 is offset radially from longitudinal axis 34.

Figure 3:
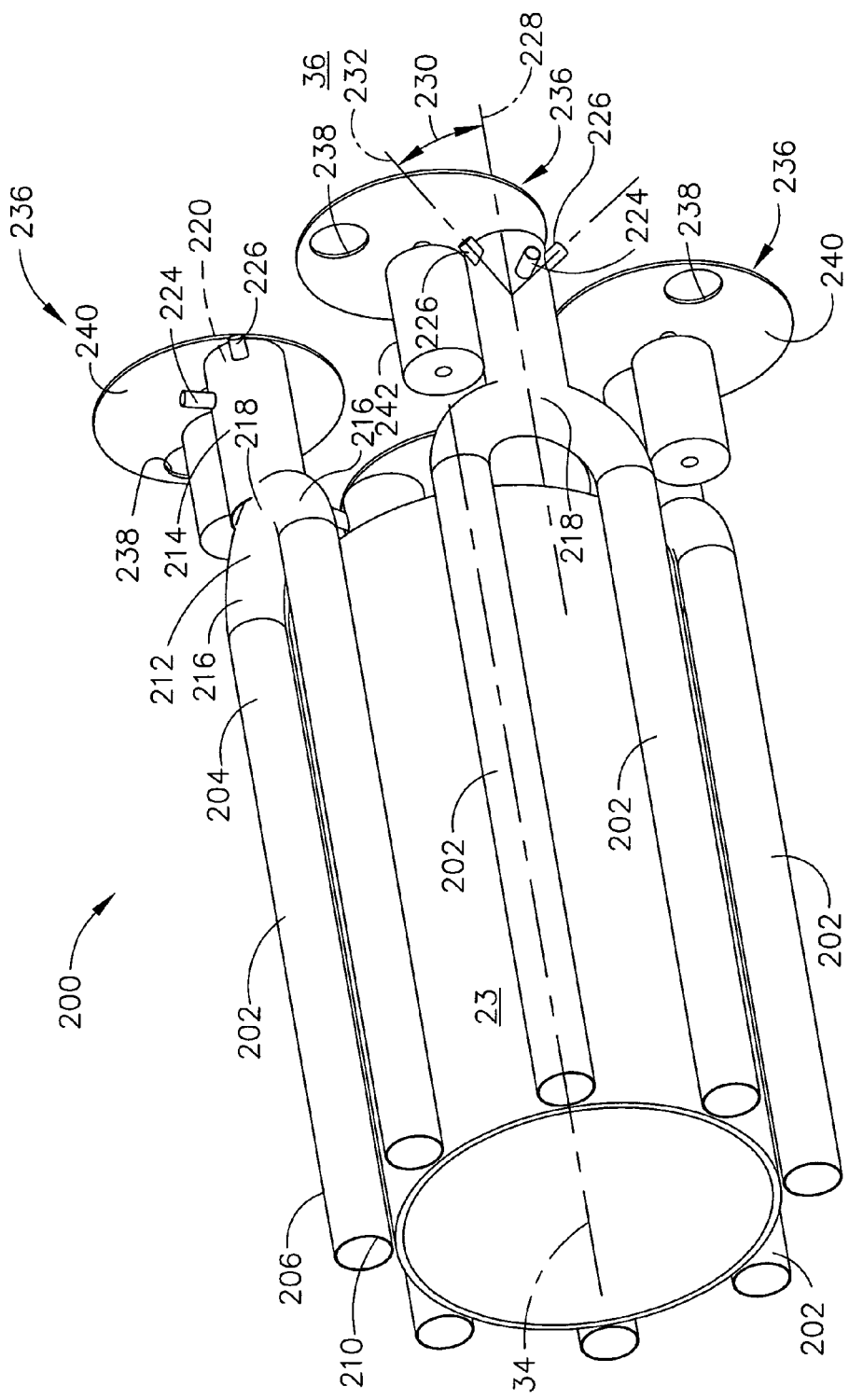
FIG. 3 is a perspective view of another exemplary embodiment of a pulse detonation system that may be used with the gas turbine engine shown in FIG. 1.

FIG. 3 is a perspective view of another exemplary embodiment of a pulse detonation system 200 that may be used with gas turbine engine 10 (shown in FIG. 1). Pulse detonation system 200 includes a plurality of pulse detonation tubes 202 that each include an inlet end portion 204, an outlet end portion 206, a generally cylindrically-shaped body 208, and a bore 210 extending therethrough. Each inlet end portion 204 includes an inlet end opening (not shown) that is coupled in flow communication with an outlet plenum 212 of a detonation chamber 214. In the exemplary embodiment, each outlet plenum 212 includes a U-shaped body having two outlet legs 216. Each outlet leg includes an outlet opening (not shown) that is coupled in flow communication with the inlet end opening (not shown) of pulse detonation tubes 202. Each outlet plenum 212 includes an inlet opening (not shown) located proximate an apex 218 of outlet legs 216 of the U-shaped body of outlet plenum 212. The inlet opening of each outlet plenum 212 is coupled in flow communication with an outlet opening (not shown) of detonation chamber 214. Each detonation chamber 214 includes an inlet end opening 220, an ignitor boss 224, and at least one fuel injector boss 226. In the exemplary embodiment, each detonation chamber 214 is illustrated with two fuel injector bosses 226, however it should be understood that more or less fuel injector bosses 226 may be used to facilitate generating an optimum fuel/air ratio and fuel/air distribution in detonation chamber 214. In the exemplary embodiment, a longitudinal axis 228 of fuel injector boss 226 is inclined by an angle 230 with respect to a longitudinal axis 232 of detonation chamber 214. Each fuel injector boss 226 may be inclined at a different angle with respect to each other fuel injector boss 226. Each angle may be selected to facilitate generating an optimum fuel/air ratio and fuel/air distribution in detonation chamber 214. In one embodiment, fuel injector boss 226 includes a ball-and-socket joint such that angle 230 is variably selectable.

In the exemplary embodiment, eight pulse detonation tubes 202 are arranged circumferentially spaced about core engine 23 in groups of two pulse detonation tubes 202. Pulse detonation tubes 202 are arranged in bypass duct 36 such that longitudinal axis 232 is radially outward from longitudinal axis 34. Each pair of pulse detonation tubes 202 is coupled to a rotary valve 234 through respective outlet plenums 212. Rotary valve 234 facilitates controlling the flow of air from fan 12 (shown in FIG. 1) to detonation chamber 214. Rotary valve 234 includes a body (not shown), a rotor disk 236 having at least one disk opening 238 and at least one solid portion 240. Rotary valve 234 is positioned such that rotor disk 236 is positioned between inlet end opening 220 and bypass duct 36. Rotor disk 236 is rotatable such that during a first portion of a rotation of rotor disk 236, disk opening 238 is positioned in substantial alignment with inlet end opening 220 to allow air from bypass duct 36 to enter respective detonation chamber 214. During a second portion of the rotation of rotor disk 236 solid portion 240 is positioned over inlet end opening 220 such that fuel and air inside the respective detonation chamber 214 may be detonated by igniting the mixture using an ignitor (not shown) or using residual heat within detonation chamber 214. Rotor disk 236 may be rotatably driven by a motor 242, for example, but, not limited to, an electric motor, an air motor, and a hydraulic motor. In the exemplary embodiment, motor 242 is an air motor, such as an air turbine that receives bleed air from core engine 23 to produce rotational motive power to rotate rotor disk 236. Motor 142 is also positioned within bypass duct 36 such that a centerline of motor 142 is offset radially from longitudinal axis 34.

The above-described methods and apparatus are cost-effective and highly reliable for generating thrust from a gas turbine engine using a pulse detonation system. Specifically, positioning one or more pulse detonation tubes within a bypass duct of a gas turbine engine such that the pulse detonation tubes are radially outboard from the gas turbine engine centerline facilitates added thrust for the gas turbine engine and provides a flow of air from an existing fan thereby reducing the addition of equipment to the gas turbine engine. A rotary valve powered by a motor permits substantially greater frequency detonations than known valves. Using the rotary valve to control only air flow into the pulse detonation tube and controlling fuel injection separately facilitates relatively greater control of the fuel/air mixture and distribution. The methods and apparatus described herein facilitate generating thrust from a gas turbine engine using a pulse detonation system in a cost-effective and reliable manner.

Exemplary embodiments of gas turbine engines using pulse detonation methods and apparatus components are described above in detail. The components are not limited to the specific embodiments described herein, but rather, components of each apparatus may be utilized independently and separately from other components described herein. Each gas turbine engines using pulse detonation method and apparatus component can also be used in combination with other gas turbine engines using pulse detonation method and apparatus components.

While the invention has been described in terms of various specific embodiments, those skilled in the art will recognize that the invention can be practiced with modification within the spirit and scope of the claims.

What is claimed is:

1. A method for generating thrust from a gas turbine engine using a pulse detonation system wherein the gas turbine engine includes a fan assembly, and a bypass duct channeling air around a core engine comprising a compressor, a combustor, and a turbine, and to the pulse detonation system, said method comprising:
   injecting a charge of fuel into a pulse detonation tube that is coupled radially outward and alongside the core engine; and
   controlling a supply of air from the fan into the pulse detonation tube through a single opening in the inlet end of the pulse detonation tube using a rotary valve that is positioned radially outward from the core engine.

2. A method in accordance with claim 1 wherein said rotary valve is driven by at least one of an electric motor, an air motor, and a hydraulic motor, wherein said controlling a supply of air into the pulse detonation tube comprises controlling a speed of rotation of the motor.

3. A method in accordance with claim 1 wherein injecting a charge of fuel into a pulse detonation tube comprises injecting a charge of fuel into a plurality of pulse detonation tubes.

4. A method in accordance with claim 3 wherein injecting a charge of fuel into a plurality of pulse detonation tubes comprises injecting a charge of fuel into a plurality of pulse detonation tubes circumferentially spaced in the bypass duct about a longitudinal axis of the core engine.

5. A method in accordance with claim 3 wherein each adjacent pair of the plurality of pulse detonation tubes includes an inlet detonation chamber in flow communication with each of the adjacent pair of the plurality of pulse detonation tubes, and wherein controlling a supply of air from the fan into the pulse detonation tube comprises controlling a supply of air from the fan into the detonation chamber.

6. A method in accordance with claim 1 wherein said motor-driven rotary valve includes a rotor disk having at least one opening therethrough and at least one solid portion, wherein said rotor disk is between the pulse detonation tube and the bypass duct, wherein controlling a supply of air from the fan to the pulse detonation tube comprises:
   rotating the rotor disk so that the opening is positioned over the inlet end of the pulse detonation tube to allow air to enter the pulse detonation tube;
   further rotating the rotor disk so that the solid portion is positioned over the inlet end of the pulse detonation tube; and
   detonating a fuel and air mixture inside the pulse detonation tube using at least one of an ignitor and residual heat within the pulse detonation tube.

7. A method in accordance with claim 6 further comprising injecting the fuel into the pulse detonation tube from an injection port formed in a sidewall of the pulse detonation tube.

8. A method in accordance with claim 6 further comprising injecting the fuel into the pulse detonation tube to form a detonatable mixture in the pulse detonation tube.

9. A gas turbine engine comprising:
   a fan assembly;
   a core engine coupled in flow communication to and downstream from said fan assembly;
   a radially outer annular bypass duct surrounding said core engine, said bypass duct extending in flow communication downstream from said fan assembly;
   at least one pulse detonation tube coupled downstream and radially outward from said core engine; and
   a rotary valve configured to control a flow of air from said bypass duct into said at least one pulse detonation tube.

10. A gas turbine engine in accordance with claim 9 wherein said at least one pulse detonation tube extends at least partially within said bypass duct.

11. A gas turbine engine in accordance with claim 9 wherein said at least one pulse detonation tube comprises a plurality of pulse detonation tubes circumferentially-spaced within said bypass duct.

12. A gas turbine engine in accordance with claim 11 wherein said plurality of pulse detonation tubes are circumferentially spaced in said bypass duct about a longitudinal axis of said core engine, each said pulse detonation tube comprises:
   an inlet end opening for receiving air from said fan;
   an exhaust end for discharging combustion gases therefrom; and
   at least one fuel inlet boss configured to introduce fuel into said pulse detonation tube.

13. A gas turbine engine in accordance with claim 12 further comprising a rotary valve comprising a rotor disk comprising at least one opening defined therein and at least one solid portion, said rotor disk is between said plurality of pulse detonation tubes and said bypass duct, said rotor disk is rotatable to control airflow through said opening into said plurality of pulse detonation tubes and control detonation within said plurality of pulse detonation tubes.

14. A gas turbine engine in accordance with claim 13 wherein said rotor disk rotatably driven by at least one of an electric motor, an air motor, and a hydraulic motor.

15. A gas turbine engine in accordance with claim 12 wherein said plurality of pulse detonation tubes are circumferentially spaced in a paired configuration in said bypass duct about a longitudinal axis of said core engine, each said pair of pulse detonation tubes comprises a detonation chamber comprising an inlet end for receiving air from said fan, and a pair of exhaust ends for discharging combustion gases through said pair of pulse detonation tubes.

16. A gas turbine engine in accordance with claim 15 wherein said detonation chamber further comprises:
   at least one fuel inlet boss coupled within said detonation chamber for introducing fuel into said detonation chamber; and
   an ignitor boss coupled within said detonation chamber to facilitate detonation of the fuel/air mixture.

17. A gas turbine engine comprising:
   a fan assembly;
   a core engine comprising a compressor, a combustor, and a turbine, coupled in flow communication to and downstream from said fan assembly;
   a radially outer annular bypass duct surrounding said core engine, said bypass duct extending in flow communication downstream from said fan assembly; and
   a plurality of pulse detonation tubes circumferentially spaced within said bypass duct about a longitudinal axis of and alongside said core engine, each said pulse detonation tube comprises:
   a single inlet end receiving air from said fan;

an exhaust end discharging combustion gases therefrom; and a rotary valve comprising a rotor disk comprising at least one opening defined therein and at least one solid portion, said rotor disk is between said plurality of pulse detonation tubes and said bypass duct, said rotor disk is rotatable to control airflow through said opening into said plurality of pulse detonation tubes during a first portion of the rotation, and wherein said rotor disk further rotates so that said solid portion is positioned over said inlet end of said one of said plurality of pulse detonation tubes during a second portion of the rotation so that the fuel and air inside said one of said plurality of pulse detonation tubes is detonated by at least one of an ignitor and residual heat within said pulse detonation tube, said rotor disk rotatably driven by at least one of an electric motor, an air motor, and a hydraulic motor.

18. A gas turbine engine in accordance with claim 17 wherein said plurality of pulse detonation tubes are circumferentially-spaced within said bypass duct in a paired configuration about a longitudinal axis of said core engine, each said pair of pulse detonation tubes comprising a detonation chamber comprising an inlet end for receiving air from said fan and a pair of exhaust end openings, each exhaust end opening in flow communication with one pulse detonation tube inlet end opening of said respective pair of pulse detonation tubes.

19. A gas turbine engine in accordance with claim 18 wherein said detonation chamber further comprising at least one fuel inlet boss coupled to a sidewall of said pulse detonation tube, said fuel inlet boss configured to receive a fuel conduit for introducing a fuel into said pulse detonation tube, said fuel inlet boss inclined with respect to a longitudinal axis of said pulse detonation tube, and an ignitor boss coupled to said sidewall to receive an ignitor for facilitating detonation of the fuel/air mixture.

* * * * *